(12) United States Patent
Pierquet et al.

(10) Patent No.: US 10,277,029 B2
(45) Date of Patent: Apr. 30, 2019

(54) ENERGY STORAGE SYSTEM WITH DUAL-ACTIVE-BRIDGE CONVERTER

(71) Applicant: Tesla Motors, Inc., Palo Alto, CA (US)

(72) Inventors: Brandon Pierquet, San Francisco, CA (US); Mehmet Ozbek, San Francisco, CA (US); Andrew David Baglino, San Francisco, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 121 days.

(21) Appl. No.: 15/281,333

(22) Filed: Sep. 30, 2016

(65) Prior Publication Data

US 2017/0093157 A1    Mar. 30, 2017

Related U.S. Application Data

(60) Provisional application No. 62/235,557, filed on Sep. 30, 2015.

(51) Int. Cl.

| | |
|---|---|
| *H02J 3/00* | (2006.01) |
| *H02M 3/04* | (2006.01) |
| *H02M 7/44* | (2006.01) |
| *H02M 3/337* | (2006.01) |
| *H02J 1/10* | (2006.01) |
| *H02J 3/32* | (2006.01) |
| *H02J 3/38* | (2006.01) |
| *H02M 3/335* | (2006.01) |
| *H02M 1/00* | (2006.01) |

(52) U.S. Cl.
CPC .................. *H02J 3/00* (2013.01); *H02J 1/10* (2013.01); *H02J 3/32* (2013.01); *H02J 3/383* (2013.01); *H02M 3/337* (2013.01); *H02M 3/33584* (2013.01); *H02M 2001/0035* (2013.01); *H02M 2001/0058* (2013.01); *Y02B 70/1491* (2013.01); *Y02B 70/16* (2013.01); *Y02E 10/563* (2013.01); *Y02E 10/566* (2013.01); *Y02E 70/30* (2013.01)

(58) Field of Classification Search
CPC ...... H02J 3/00; H02J 3/36; H02J 3/32; H02M 3/337; H02M 2001/0058; H02M 2001/0035; H02M 3/33584; Y02E 60/60
See application file for complete search history.

(56) References Cited

U.S. PATENT DOCUMENTS

| | | | | |
|---|---|---|---|---|
| 2011/0084677 A1* | 4/2011 | Shi | ........................ | H02M 3/156 323/284 |
| 2011/0249472 A1* | 10/2011 | Jain | ................... | H02M 3/33584 363/15 |
| 2012/0105001 A1* | 5/2012 | Gallegos | ............... | B60L 3/0046 320/109 |

(Continued)

*Primary Examiner* — Rexford Barnie
*Assistant Examiner* — Thai Tran
(74) *Attorney, Agent, or Firm* — Garlick & Markison; Bruce E. Garlick (57) ABSTRACT

An energy storage device includes: a number of cells; and a dual-active-bridge converter connected to the cells, wherein the cells are floating relative to the system and are galvanically isolated therefrom. The energy storage device can be included in an energy storage system that includes: a grid tie unit comprising at least one DC/AC converter; and multiple pods connected to the grid tie unit, each pod including: a number of cells; and a power electronics unit, wherein the cells are floating relative to the system and are galvanically isolated therefrom.

8 Claims, 9 Drawing Sheets

(56) References Cited

U.S. PATENT DOCUMENTS

| | | | |
|---|---|---|---|
| 2012/0267952 A1* | 10/2012 | Ballatine | H02J 1/102 |
| | | | 307/26 |
| 2013/0127396 A1* | 5/2013 | Triebel | H02J 3/32 |
| | | | 320/101 |
| 2014/0176079 A1* | 6/2014 | Ito | B60L 11/1866 |
| | | | 320/134 |
| 2015/0365005 A1* | 12/2015 | Panov | H02M 3/33584 |
| | | | 307/24 |

\* cited by examiner

ENERGY STORAGE SYSTEM WITH DUAL-ACTIVE-BRIDGE CONVERTER

CROSS-REFERENCE TO RELATED APPLICATION

The present U.S. Utility patent application claims priority pursuant to 35 U.S.C. § 119(e) to U.S. Provisional Application No. 62/235,557, entitled "ENERGY STORAGE SYSTEM WITH DUAL-ACTIVE-BRIDGE CONVERTER", filed Sep. 30, 2015, which is hereby incorporated herein by reference in its entirety and made part of the present U.S. Utility patent application for all purposes.

BACKGROUND

Various approaches for energy storage have been tried. Some batteries that are designed for large scale energy storage have smaller cells arranged in series and parallel. For example, some cells are arranged in parallel, and then that unit is arranged in parallel with another similar unit, and so on. This can require the system to have a disconnect and fuse, and to apply some management strategy that occurs at the high level. These systems can be configured so that they are paralleled at an electrical interface, which can make them complicated to parallel.

One problem with such approaches can be that when batteries are paralleled, one must match their voltage characteristics precisely because they are in parallel electrically. This can significantly limit scalability of the system. For example, one may need to use very similar chemistry, or similar cells, or come up with particularized balancing strategies, to manage the different cells within their ranges of operating characteristics. Also, with regard to the individual cells, the system is in a sense limited by its weakest link. That is, if one cell malfunctions this typically renders the whole array of batteries out of service.

DETAILED DESCRIPTION

This document describes examples of systems and techniques for providing an energy storage system that is scalable anywhere from a limited installation on a small site (e.g., for a residence or a small business) to a massively large system at a major site (such as for a large company or a city). One approach involves taking a relatively smaller block of cells, providing a power electronics converter for it, and galvanically isolating the block. This can provide a building block that one can parallel as many times as necessary, because the battery has been provided with a power electronics interface. One advantage of this approach is that different types of cells can be used on the same field. For example, in a field that includes batteries with a cumulative capacity of one GWh or more, the system can allow use of different cell types, different ages of cells, different cell voltages and/or different physical types of cells. The common power electronics interface provides a DC system for the cells so that they can be considered part of a DC microgrid. This in turn can allow the cells to all be failure independent, so that any particular cell can fail and it will not take out the whole system. This can eliminate or reduce failure propagation, provide scalability and ability to parallelize, as well as provide system ignorance to cell make, energy type, and cell age. In short, one can provide an energy storage system with the advantage that it does not include a high-voltage battery.

Examples herein describe cells as being a basic building block of the energy storage system. In various implementations, any suitable form of electrolytic cell can be used. For example, this includes, but is not limited to, lithium-ion cells having a generally cylindrical form factor.

Figure 1A:
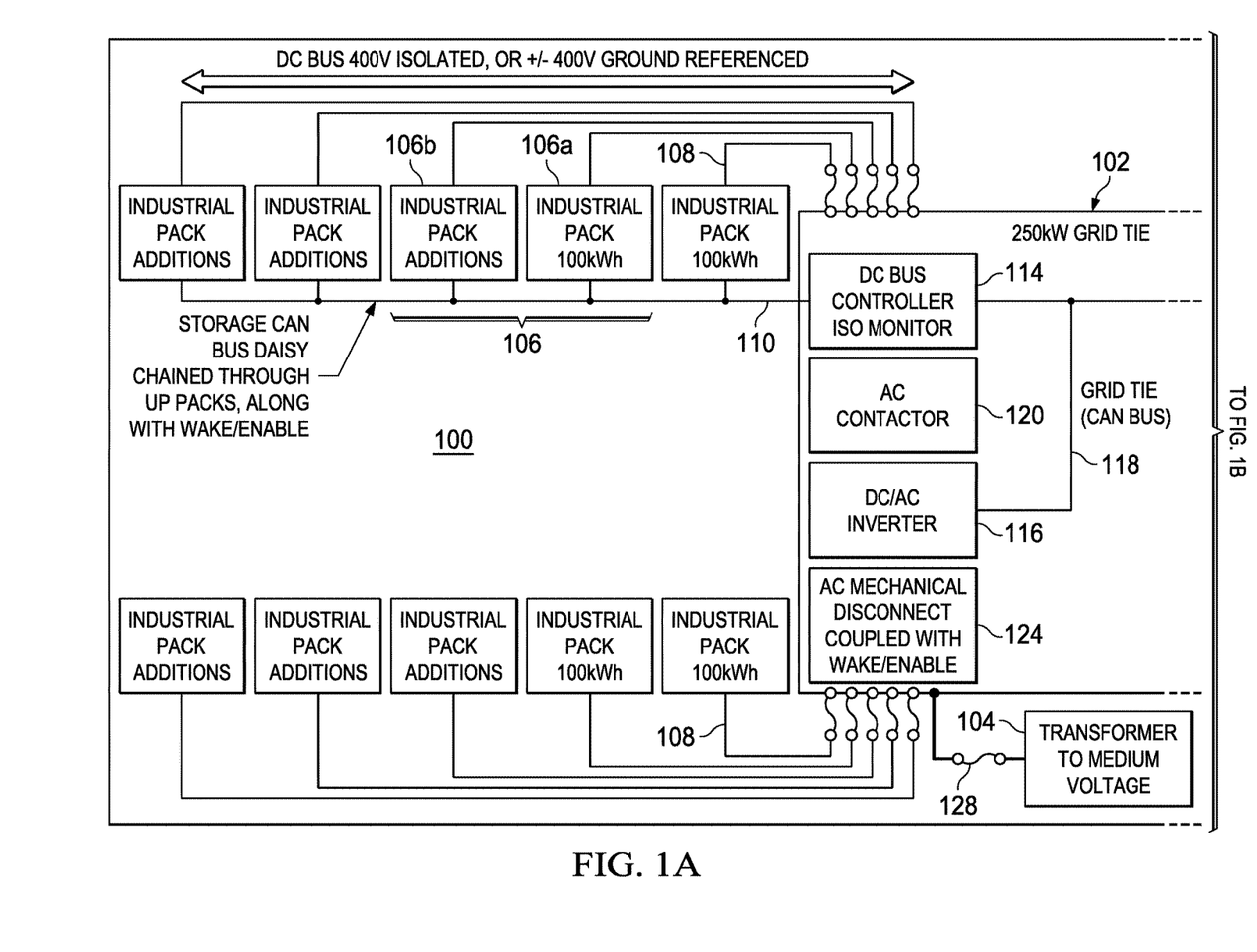
FIGS. 1A and 1B show an example of an energy storage system.
Figure 1B:
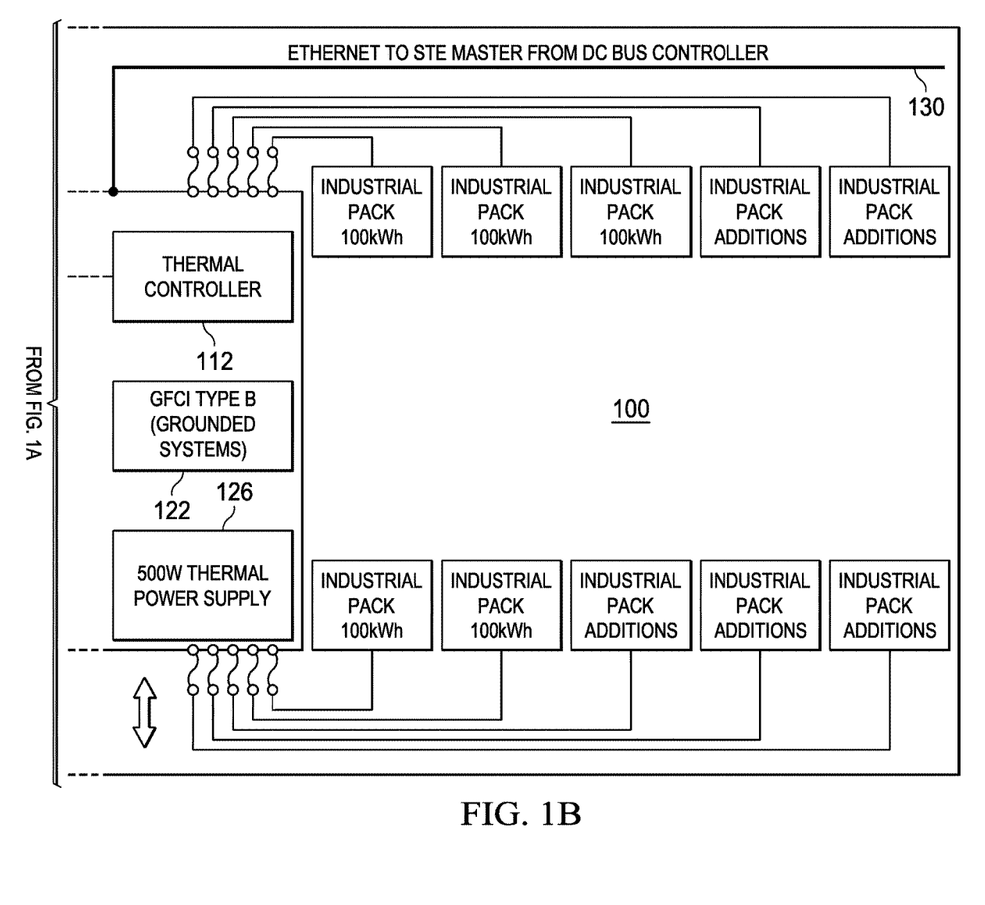

FIGS. 1A and 1B show an example of an energy storage system 100. This can be considered an "industrial" system implemented at a site, as opposed to, say, a different system that is instead intended primarily for residential use. However, implementations—whether large or small—can be used in a variety of contexts for many different purposes. Referring to both FIGS. 1A and 1B, the energy storage system 100 includes a power grid tie 102 that converts high-voltage DC from storage modules to AC. In some implementations, the grid tie 102 delivers AC (e.g., through a 480V, 3-phase connection) to a transformer 104, such as for transformation to medium voltage, which can then be conveyed to a remote location through a grid (not explicitly shown). For this reason, the grid tie 102 can be referred to as a "grid tie" in the system. Instead of, or in addition to, the transformer 104, one or more other components can be used. For example, at the site level a contactor can be placed between the grid and the grid tie. For example, when multiple such systems are parallelized at a single site, they can all share a connection to the grid. In this example, the grid tie has a capacity of about 250 kW, but higher or lower effect can be used in other implementations.

One or more packs 106 are included in the system and are connected to the grid tie 102 by a DC bus 108. The bus leads current from the packs 106 to the grid tie 102 when delivering energy to the grid, and from the grid tie 102 to the packs 106 when they are being charged. The packs 106 are also referred to as "packs," as each one can be enclosed in an individual cabinet that has its own thermal control system. Each pack 106 has cells inside it that provide the energy storage. Here, a pack 106A is labeled as having a nominal capacity of 100 kWh, whereas another pack 106B is labeled as being an additional unit. For example, each of the packs 106 can contain a certain number of subunits, here called "pods," which contain the cells and control them. In some implementations, the packs 106 can be part of a standard setup and the additional packs (which may have the same or a different capacity) can optionally be added to grow the system. This is an example of the system's scalability. A total of ten packs 106 are included in the system in this exemplary illustration.

A bus 110 can provide another connection between the packs 106 and the grid tie 102. In some implementations, this involves communications and/or control of the packs 106 or the individual pods inside them. For example, the bus 110 can be used for a controller area network (CAN) between a certain number of daisy-chained packs (e.g., five). As another example, a control message, such as a wake and/or enable signal, can be transmitted through the bus.

The system 100 can include various thermal control systems. In some implementations, each unit in the system 100 can have a separate system that controls the respective cabinet, etc., where the unit is housed. For example, the grid tie 102 here has a thermal control system 112 that manages the temperature of components of that unit.

The grid tie 102 can communicate with the individual packs, and/or with all packs, to monitor their status and to issue various commands as to their operation. Here, a DC bus controller 114 in the grid tie is connected to the bus 110. For example, the DC bus controller 114 can serve as an isolation monitor for each of the packs.

The grid tie 102 has one or more DC/AC inverters 116 that transform the DC from the packs 106 into AC for the grid, and vice versa. Any number of inverters, and/or sizes thereof, can be used. Solely as an example, when the system 100 is a 250 kW system, ten inverters of 25 kW each can be used. The inverters can be connected to the DC bus controller 114 and/or to the thermal control system 112 by a bus 118. For example, this allows the DC bus controller to regulate the individual packs, and the thermal control system to regulate the cooling for the cabinet of the grid tie.

The connection between the inverters and the grid can be provided using one or more AC contactors 120. One or more safety devices can be provided in the grid tie 102. In some implementations, a ground fault current interrupter 122 is used. For example, this can be implemented in grounded systems. An AC mechanical disconnect 124 can be provided for the grid tie. This can allow the grid tie to be mechanically disconnected from, or connected to, the grid connection.

A thermal power supply 126 can be provided in the grid tie. In some implementations, this powers the cooling system that is controlled by the thermal control system 112. In this example, a 500 W supply is used.

One or more fuses 128 can be provided between the grid tie 102 and the grid. This fuse can limit current to a specified maximum value. For example, a 30-40 kA limiting capacity can be provided.

It was mentioned that the DC bus controller 114 can be used for communication to and from the grid tie. In some implementations, the controller is in connection with a bus 130. For example, this can be a network connection (wired or wireless, such as by Ethernet) to a site master computer. That is, the packs 106 can deliver or receive high voltage DC by way of the DC bus 110. In some implementations, the bus can be isolated, or ground referenced. The bus voltage 400V is mentions as an illustrative example only; higher or lower values can be used.

Figure 2:
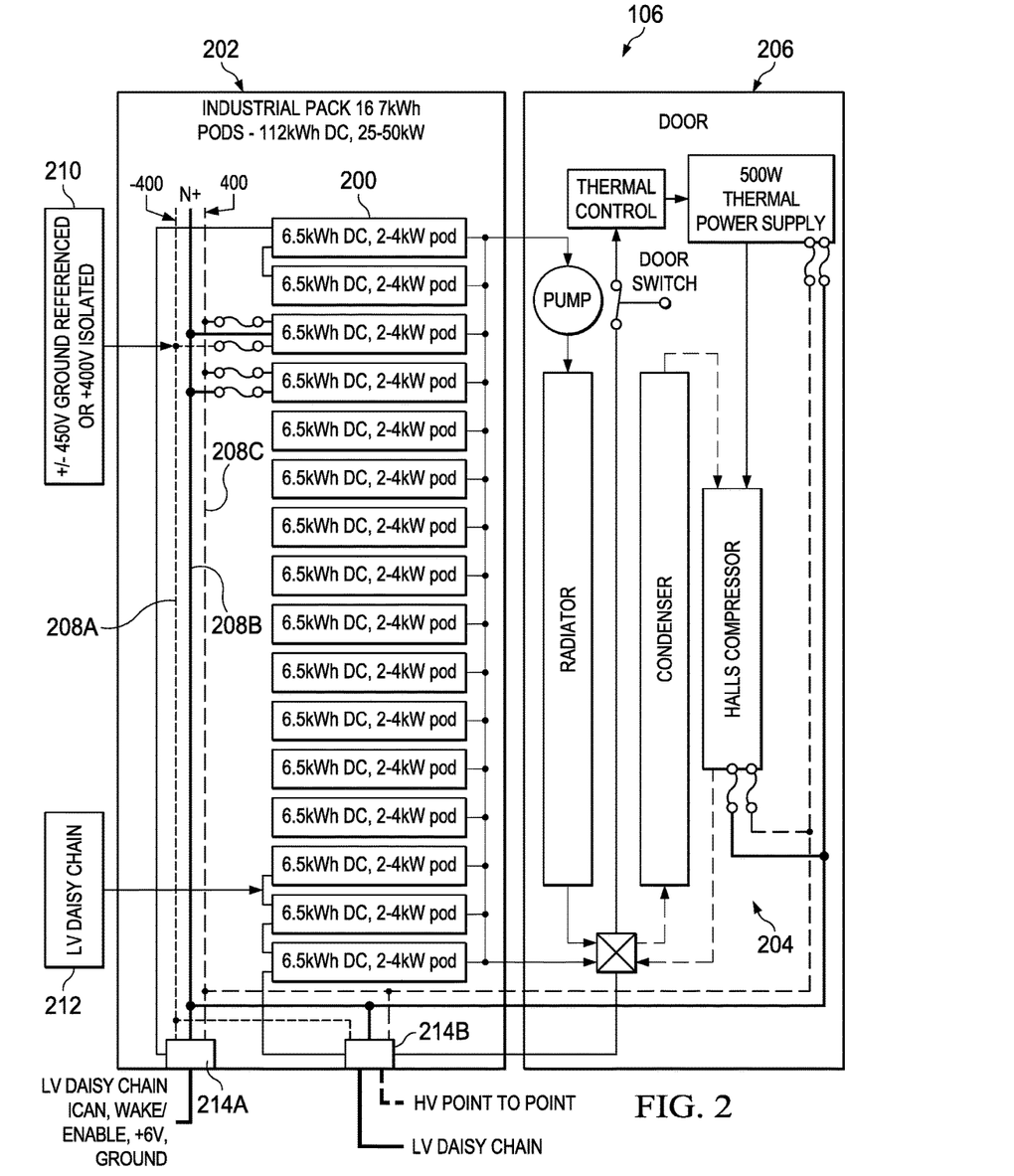
FIG. 2 shows an example of one of the packs from FIG. 1.

FIG. 2 shows an example of one of the packs from FIG. 1. In some implementations, the pack includes 16 pods 200, here schematically shown arranged in a vertical array inside a cabinet 202. Solely as an example, each pod 200 can have a capacity of about 6.5 kWh DC, and an effect of about 2.4 kW. That is, the cabinet 202 can be the freestanding unit that houses the pods 200 for purposes of both transportation and permanent operation at the installation site. Solely as an example, the entire pack can have a capacity of about 112 kWh DC, and an effect of about 25-50 kW.

As is described in more detail below, each of the pods 200 includes a power electronics unit so that the battery therein is isolated. This power electronics unit can include one or more DC/DC converters. For example, a transformer can be used to convert between about 30-50V DC from the cells to about 350-450V on the bus side.

The cabinet is provided with a thermal system 204 that is in this example is mainly installed on a door 206 of the cabinet. In some implementations, the thermal system is based on using one or more radiators and/or condensers and a fan, in connection with a system for circulating coolant among the cells of the respective pods. For example, the thermal system can also include a thermal control system, a thermal power supply unit (e.g., of 200 W capacity), a compressor and one or more valves for controlling coolant flow. For example, a door switch can regulate operation of the thermal system.

The pack can have one or more buses. In some implementations, buses 208A-C can be used. For example, these can be configured for conveying, respectively, a negative voltage (e.g., on the order of −400V), a neutral level, and a positive voltage (e.g., on the order of +400V). In some implementations, one or more fuses 210 is provided. For example, this can allow up to a designated amount of current to flow when the voltage is +/−450V ground referenced, or +400V isolated.

The pods 200 can have one or more low-voltage (LV) connections between each other. Here an LV daisy chain 212 is shown between a few pods. For example, this can be used for communication and/or other purposes.

One or more junction boxes 214A-B can be provided in the pack. That is, the system that includes the pack can have high voltage DC running to and from pack, for example as cables coming to a junction box for the grid tie, or as a daisy chain between the packs. In a sense, the junction box can provide a way to feed all pods of the pack into a much larger cable for the rest of the system. In some implementations, the junction box 214A can provide the LV daisy chain connection for the pods. For example, this can involve a +6V/ground connection, for CAN communication and/or a wake or enable signal. In some implementations, the junction box 214B can provide a high voltage (HV) point-to-point connection and/or a LV daisy chain connection.

Figure 3:
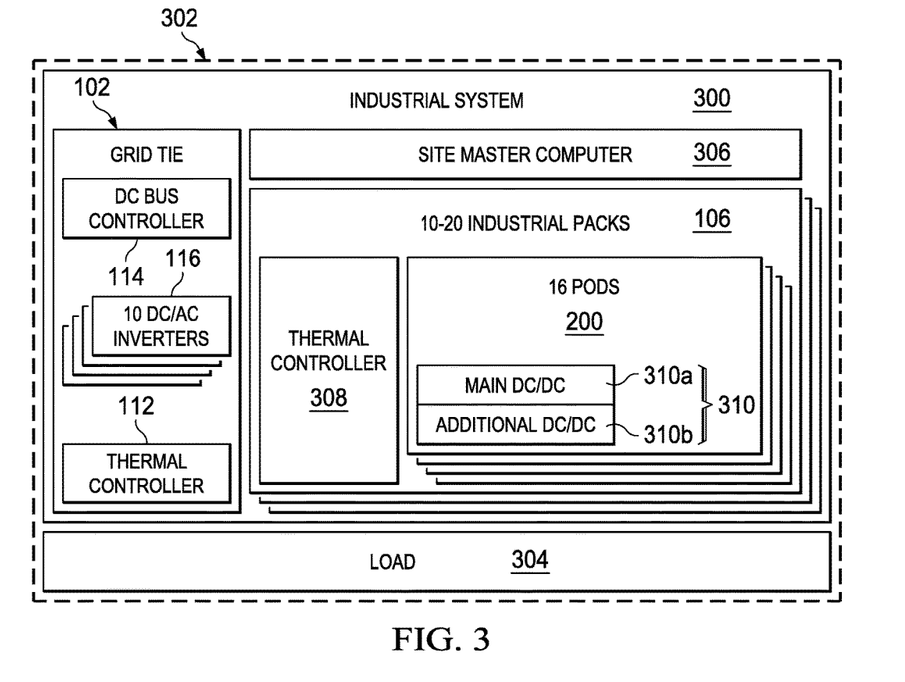
FIG. 3 shows an example of an industrial energy storage system.

FIG. 3 shows an example of an industrial energy storage system 300. The system 300 is implemented as part of an installation (sometimes called "site") 302 that also includes one or more loads 304. A power supply for the system, which can be, for example, an energy source (e.g., solar panels) or a grid connection, is not shown for clarity. For example, the installation 302 can be a factory or other industrial unit (e.g., a building) and the load 304 is any (AC driven) electrical component therein, such as an internal electrical system. As another example, the installation 302 can be a vehicle (e.g., a truck) powered at least in part by electricity. For example, the load 304 can then be one or more electrical traction motors that are part of the vehicle's powertrain.

The system 300 here includes the grid tie 102 with the DC bus controller 114, the inverters 116 and the thermal control system 112. These components can operate substantially as described above, in some implementations. For example, when the energy storage system 300 is installed in a vehicle, the grid tie can be located off-vehicle, so that the grid tie is only connected to the system when the vehicle is stationary.

The DC bus controller 114 is connected to the DC bus that connects to the different packs. The controller instructs the packs what to do, and they in turn report back their respective conditions and what they are doing. That is, there can be a communication from every pod to the DC bus controller, and from the grid tie inverter to the DC bus controller. The DC bus controller also talks to a site master computer 306. For example, when the system 300 is one of multiple such systems at a site, the site master computer can be the one that controls them as a group and provides a common interface for a person monitoring or operating the installation. As a particular example, the site master computer can provide functionality for islanding the site consisting of several such systems.

The system 300 can include any number of the packs 106. Solely as an example, it is here indicated that 10-20 packs can be installed together. Each of the packs 106 can include one or more of the pods 200. Solely as an example, 16 pods 200 can be included in a pack.

A thermal control system 308 can be provided in each pack 106. The communications between pods 200 and the respective thermal control system 308 can be on a common link so that they all can receive (but not necessarily react to) each other's messages. As such, each pod 200 can tell its own thermal control system 308 what the current temperature of the pod's 200 battery is. The thermal control system 308 of that pack 106 can listen to its own pods 200 and regulate the amount of coolant accordingly.

Each pod 200 includes one or more converters 310A/310B that are part of a power electronics unit for the pod 200. These can be used for DC/DC conversion to and from the battery of the individual pod 200. In some implementations, the primary goal of the converter 310A (and/or 310B) is to convert between a low-voltage battery DC and a high-voltage bus DC. The power electronics unit provides high efficiency galvanic isolation of the battery. The power electronics can also control the pod 200 in one or more regards, such as to regulate what its power transfer should be. The power electronics unit is configured to regulate the internal current of the pod—that is, of the cells in the battery—to generate its particular output in any given situation.

The DC/DC converter 310A helps isolate the cells themselves from the high-voltage bus that all cells would normally share. This helps deal with the situation that when cells are brought together to make modules for a battery pack, they're not easily parallelable. This arrangement provides the advantage that one need not have particular concern about what the cells, or what state they are in, because the cells are isolated from the other ones. In a sense, the cells in the respective pods 200 are being treated as individual energy sources. In some implementations, this can allow use of old and new cells as part of a common system. For example, cells can be added to an existing system as the site needs to expand or the original cells become aged. That is, the advantage of not having cells hard wired to each other can be obtained.

That is, the DC/DC converter 310A can isolate cells from each other and from the system, and allow them all to be actively controlled. In some implementations, the DC/DC converter 310A is bidirectional to charge and discharge cells. The DC/DC converter 310A can be configured to control the power flow of the pod 200 and to provide various modulation schemes. For example, in a heat mode one can intentionally run the DC/DC converter 310A inefficiently so that heat is generated, for the purpose of heating up the batteries. This can be applied in cold climates when the batteries need heating. As another example, the power electronics can sample one or more currents to make measurements and thereby regulate current output and/or power.

The following is an example relating to the DC/DC converter 310A. The battery inside the pod can be on the order of about 30-50V. The power electronics can take that volt power, isolate it, and bring it up to a higher level, such as on the order of about 350-450V. The cells of the pod are isolated, so if there is any leakage or short from any battery point to ground, this may not pose an immediate hazard. Rather, the battery can be floating, so that if any point is grounded the battery loses isolation. The power electronics, in turn can detect that and report it (e.g., to a DC bus controller). That is, because the battery in each pod is floating—it is isolated from the high-voltage system, and to ground—it may take two separate faults to occur before a significant electrical hazard is present.

Here, a main DC/DC converter 310A also includes battery management hardware. That is, the power of each of the pods 200 in the pack 106 can be converted from about 30V to about 350-450V, which can require diligent management of the state that the cells are in at any given time. The battery management hardware can service respective clusters of cells, sometimes referred to as bricks, which may be series connected in the pod. For this purpose, the hardware can perform voltage measurements or temperature measurements, keep track of the amount of charge (e.g., in Coulombs) passing in and out of the battery, and/or communicate with the rest of the system about the health and power of the battery. An additional DC/DC converter 310B can essentially be identical to the main converter except for not having the hardware for managing the battery and/or engaging in communication. Rather, the additional DC/DC converter 310B can operate in parallel to the main one, and serve to increase the power level of the pod.

Figure 4:
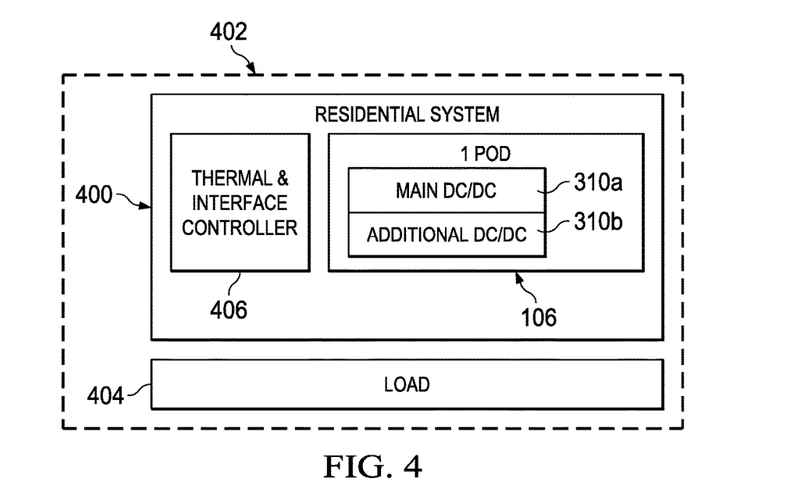
FIG. 4 shows an example of a residential energy storage system.

FIG. 4 shows an example of a residential energy storage system 400. The system can be implemented within an installation 402, such as a residential building or another housing unit. A load 404, such as an appliance, can be driven by the system. The system 400 includes a thermal and interface controller 406. For example, this can perform thermal management, such as along the lines described above, and can control the power supply to and from the pack 106 that is included in the system. That is, the system in this example includes only a single pack 106, as opposed to multiple ones. The pack 106 can include the main DC/DC converter 310A and optionally the additional DC/DC converter 310B. These can operate substantially along the lines as described above.

In principle, the system 400 can use the same type of cells as any other system, such as the system 300 (FIG. 3). In some implementations, however, different applications make it favorable to use different types of cells. For example, a unit that is designed for power cycling can have cells of a particular type, where as another unit designed for long term storage can have a different type of cells.

Figure 5:
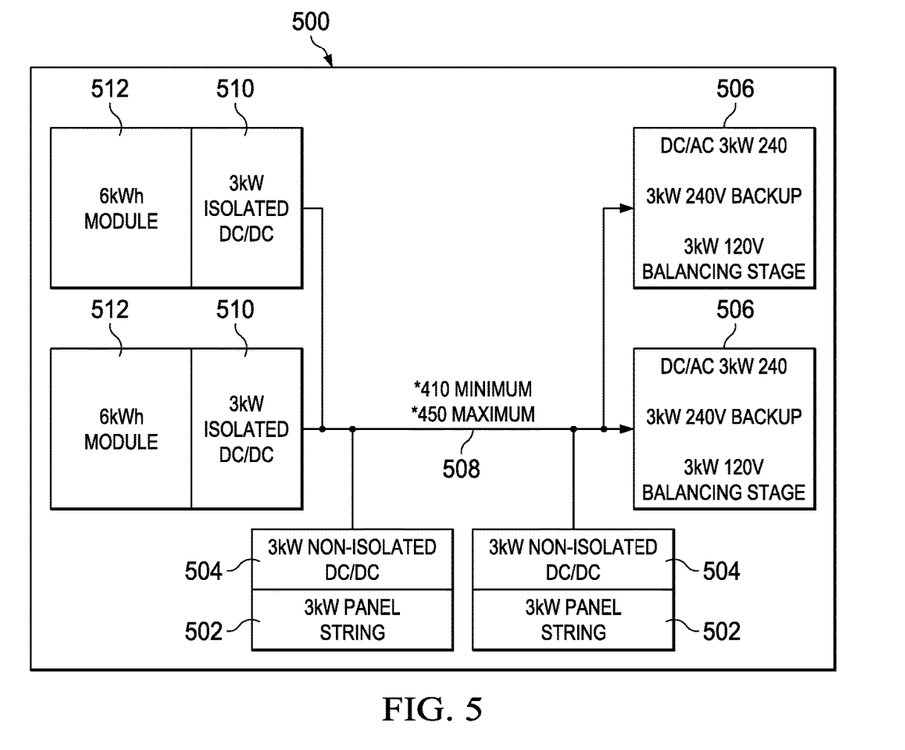
FIG. 5 shows an example of an energy storage system in an implementation together with solar panels.

FIG. 5 shows an example of an energy storage system 500 in an implementation together with solar panels 502. Each of the solar panels (or the solar panel strings) can have a DC/DC converter 504. In some implementations, this is a non-isolated converter.

The system 500 is an example of how an energy storage system can be tied together with an alternative energy system. Components 506 here are AC components connected to a grid (not shown). For example, each component can include a DC/AC converter, a power/voltage backup, and a balancing stage. The numbers given are for illustrative purposes only and other values can be used.

An intermediate bus 508 can connect components of the system 500 to each other. For example, this bus can operate at a level on the order of about 450V. A solar panel can then be connected to the system simply by tapping into the bus. This allows the power from the solar panel to go to the battery through fewer converters. That is, the power can pass from the DC/DC converter 504 to a respective DC/DC converter 510 and then to the respective battery 512. For example, the converters 504 can be max power point tracking (MPPT) converters that essentially describe a track for the most efficient point of the respective panel. Any number of solar panels (or arrays) can be connected to the bus. An alternative would be to first go to the AC system, but then the power would go through three converters, each taking out some efficiency. One advantage of the system is that if the AC load is fixed—such that one cannot push more than that—then one can use the AC system during the day for solar, and put the excess in the battery. At night, on the other hand, once can go through the battery so as to double use this extra capacity. This is example of a home or residential system for solar.

Figure 6:
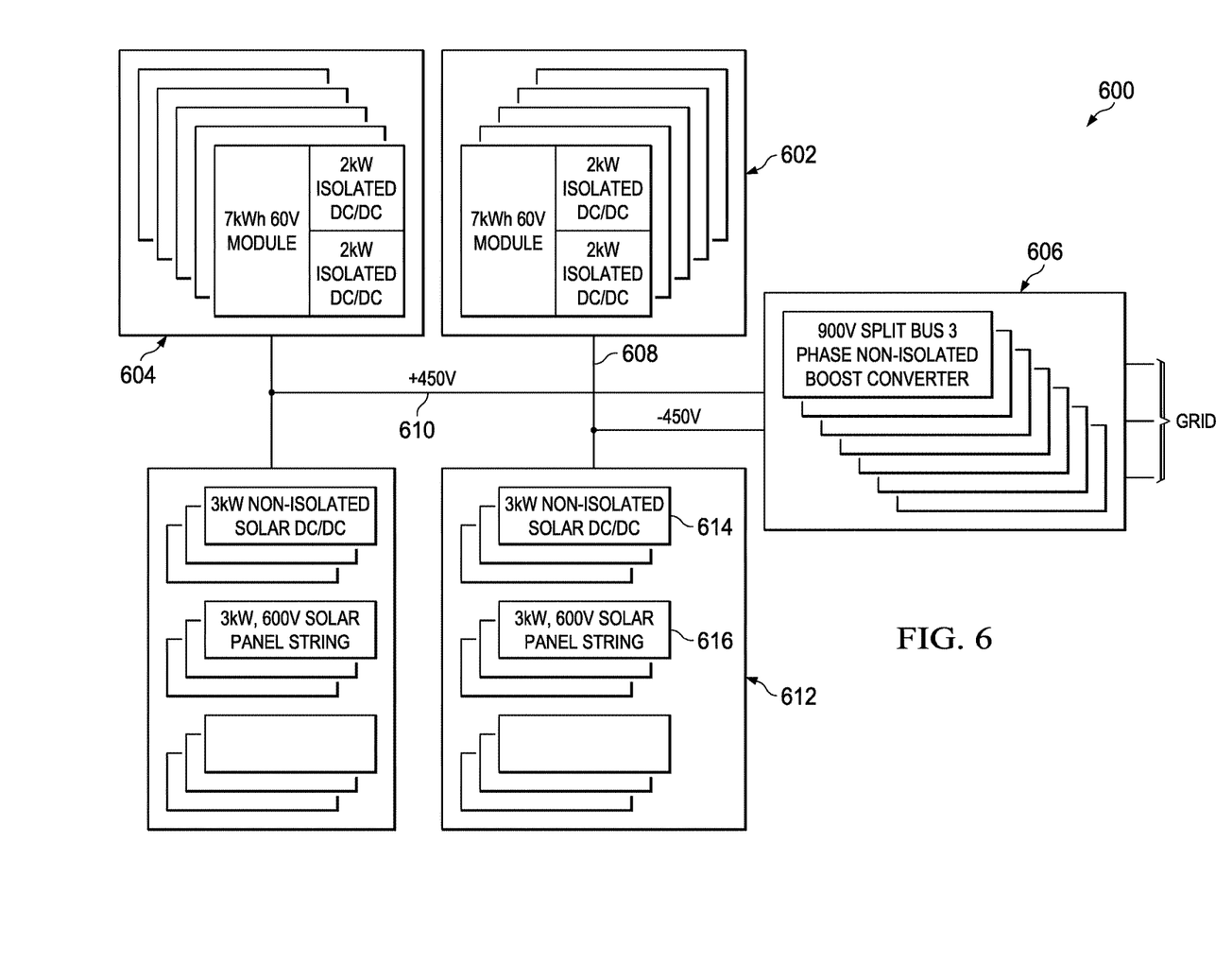
FIG. 6 shows an example of a high-power and high-voltage energy storage system.

FIG. 6 shows an example of a high-power and high-voltage energy storage system 600. The system has multiple pods 602, and other pods 604 connected to a grid tie 606. The connections are by way of respective buses 608 and 610. Solely as an example, the bus 608 can be on the order of about −450V, and the bus 610 can be on the order of about +450V. This can provide a parallel/series connection of packs for additional power. For example, a +450V pack and a −450V pack can be serially connected so as to provide 900V, and that unit can then be parallel connected to another 900V unit, and so on. Also shown are solar units 612. For example, a unit can include one or more converters 614 and one or more solar panel strings 616.

Figure 7:
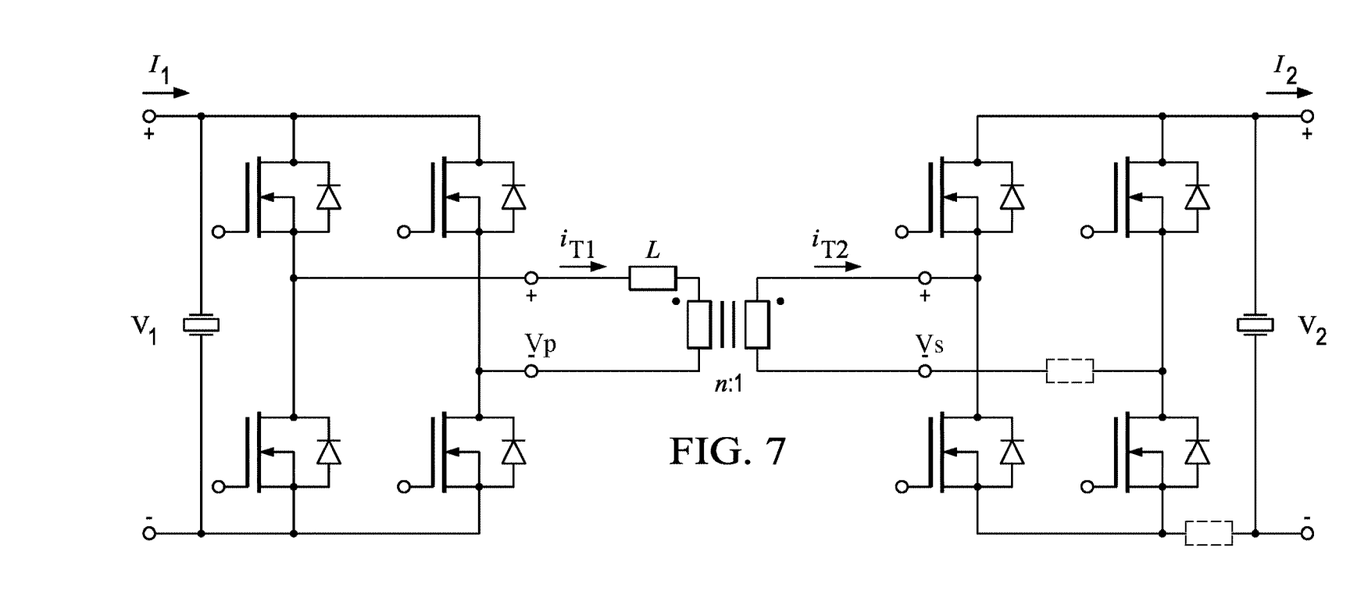
FIG. 7 shows an example of a dual-active-bridge converter.

FIG. 7 shows an example of a dual-active-bridge converter. In some implementations, a dual-active-bridge (DAB) converter can be included in the power electronics of any pod described herein in the prior FIGs. The dual-active-bridge converter can perform current sampling and/or operate in a burst mode in which its output varies as compared to a continuous mode of operation. A currently sampling mode of operation is described with reference to FIG. 8 and a burst mode of operation is described with reference to FIG. 9. More description and examples of such operations are provided in the document entitled DAB Single-Cycle Waveform Calculations, explicitly filed with the provisional application to which this application claims priority, with the entire contents of which are incorporated herein by reference.

Based upon the relative waveforms of each bridge of the DAB converter, the DAB converter waveforms can be broken down into multiple configurations. If zero-voltage switching behavior is placed as a constraint, there are two primary modes, depending on whether both bridge positive-voltage waveforms overlap during each period. These primary modes are described as a "direct mode" and an "indirect mode." The direct mode is the typical operating mode, occurring primarily during moderate to large duty-cycles of the DAB converter. In the indirect mode, which is an uncommon control configuration, occurring with small duty cycles or when the DAB converter is required to generate large currents while maintaining small output current.

For each of the direct and indirect modes continuity is required, i.e., that the current of the DAB converter of the direct and indirect modes are equal at their overlap point, ensuring that the behavior of the DAB converter is continuous. Thus, according to the present disclosure, in each of the direct and indirect configurations, multiple conditions exist for sampling the current.

Figure 8:
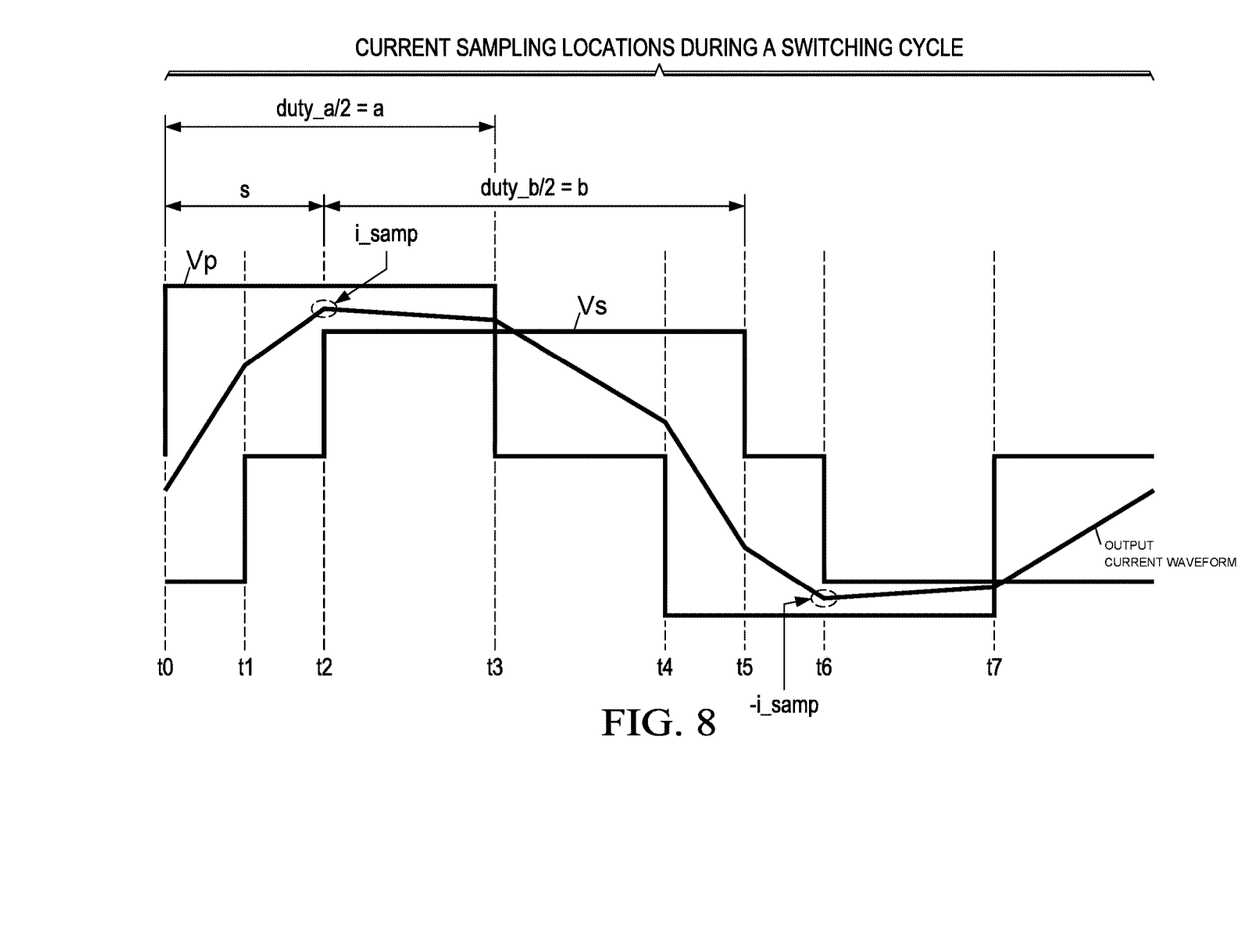
FIG. 8 shows an example of current sampling in a dual-active-bridge converter.

FIG. 8 shows an example of current sampling in a dual-active-bridge converter. In some implementations, a pod described herein can perform current sampling. Determining the output current of the DAB converter is typically done by looking at a low-pass filtered current output to determine an average. This inherently reduces the bandwidth of the current controller and results in a slower transient response. To avoid this problem, the current waveform is directly sampled at specific points in the switching cycle, and using knowledge of the voltage waveforms being applied, the average current of the DAB converter can be directly calculated. The sample points are specifically chosen such that the resulting derivation is independent of the switching period and of the inductance of the circuit. Such sample point selection provides robustness against parameter variation, and is compatible with frequency control.

The sample point(s) occur at the mid-point of the on-time of a bridge leg. Depending on the relative phase of the two converter bridges, as well as the duty-cycles of each bridge, a number of different waveform and sample-point relationships result. These are broken down into direct and indirect modes, as well as where in the waveform the sample point(s) occur. The solution for each combination of sample point(s) fits into a framework presented. The use of a same equation framework with only modified constants makes real-time computation much faster as a same algorithm runs in each case. This ultimately makes it possible to vary the switching behavior of the converter every half switching-cycle and obtain a current control bandwidth on the order of the switching frequency.

Figure 9:
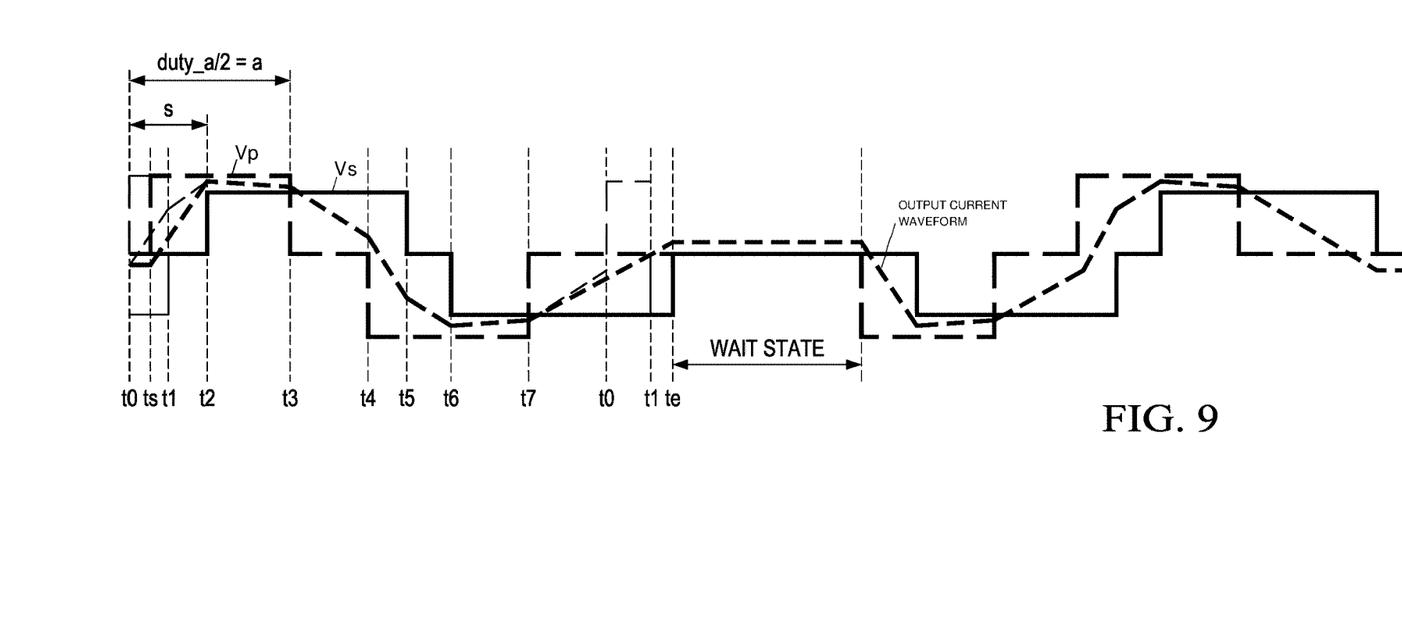
FIG. 9 shows an example of a burst mode in a dual-active-bridge converter.

FIG. 9 shows an example of a burst mode in a dual-active-bridge converter. In some implementations, a pod described herein can have a burst mode. As the power requirement goes below a certain level for a given V1 and V2 that ensures soft switching, the device goes into a burst mode operation. In burst mode the device introduces a 'wait state' into the operation where no current is rectified by either the V1 or V2 bridge. The length of the wait state is dependent on the ratio of power requirement to minimum power that allows soft switching. During the wait state just enough current is kept in the inductor to make sure the first switching edge after the wait is a soft switching edge. The continuous operation under the minimum soft switching power is outlined in the dashed waveform. The burst mode aligns the first switching edge of the pulse to start from wait state current and overlay the current waveform with the continuous current waveform by the second edge. The same is done at the last edge to finish in wait state current again in the opposite polarity. Every other pulse is flipped since the wait state current polarity changes every pulse.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from Figure to Figure, the embodiments may incorporate the same or similarly named functions, steps, modules, etc. that may use the same or different reference numbers and, as such, the functions, steps, modules, etc. may be the same or similar functions, steps, modules, etc. or different ones.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. An energy storage device comprising:
a grid tie unit comprising at least one DC/AC converter, the grid tie unit coupling the energy storage device to an external AC system;
a DC bus coupled to the grid tie unit;
a plurality of pods connected to the DC bus, each pod of the plurality of pods including:
a plurality of battery cells; and
a power electronics unit including a dual-active-bridge converter connected to the plurality of battery cells, wherein the dual-active-bridge converter includes a first bridge coupled to the plurality of battery cells and a first side of a transformer, and a second bridge coupled to a second side of the transformer and the DC bus, the power electronics unit configured to:
selectively operate the dual-active-bridge converter in a direct mode and an indirect mode, wherein in the direct mode a positive-voltage of the first bridge overlaps a positive-voltage of the second bridge during a switching cycle of the dual-active-bridge converter;
sample a current of the transformer at two or more sample points in the switching cycle of the dual-active-bridge converter to generate current samples;
based on the current samples, estimate an average output current of the dual-active-bridge converter;
determine that a power requirement of the pod is below a level that ensures soft switching of the dual-active-bridge converter and, in response, place the dual-active-bridge converter in a burst mode of operation, wherein the burst mode of operation includes introducing a wait state where no current is rectified by the dual-active-bridge converter; and
align a switching edge of a pulse of the switching cycle with an end of the wait state.

2. The energy storage device of claim 1, wherein the dual-active-bridge converter of the power electronics unit samples the current.

3. The energy storage device of claim 1, wherein the two or more sample points are chosen based on a midpoint of an on-time of a bridge leg of the first bridge.

4. The energy storage device of claim 1, wherein sampling the current of the transformer at two or more sample points in the switching cycle of the dual-active-bridge converter includes sampling of a first current during the direct mode of operation and sampling a second current during the indirect mode of operation.

5. The energy storage device of claim 1, wherein the power electronics unit is further configured to vary a switching behavior of the dual-active-bridge converter every half switching cycle to obtain a current control bandwidth on an order of a switching frequency of the dual-active-bridge converter.

6. The energy storage device of claim 1, wherein a duration of the burst mode of operation is dependent on a ratio of power requirement to minimum power.

7. The energy storage device of claim 1, wherein during the wait state sufficient current is maintained in an inductance of the dual-active-bridge converter to ensure that the switching edge is a soft switching edge.

8. The energy storage device of claim 1, wherein the plurality of pods are arranged as a plurality of packs, each of the plurality of packs including:
a cabinet including one or more of the plurality of pods; and
a thermal control system configured to monitor and regulate a temperature of the one or more of the plurality of pods.

* * * * *